(12) United States Patent
Roddis

(10) Patent No.: US 6,887,922 B1
(45) Date of Patent: May 3, 2005

(54) GLASS COMPOSITE

(75) Inventor: James Roddis, Shefield Hallam University (GB)

(73) Assignee: Sheffield Hallam University, Sheffield (GB)

( * ) Notice: Subject to any disclaimer, the term of this patent is extended or adjusted under 35 U.S.C. 154(b) by 0 days.

(21) Appl. No.: 10/069,338

(22) PCT Filed: Sep. 1, 2000

(86) PCT No.: PCT/GB00/03347

§ 371 (c)(1),
(2), (4) Date: Feb. 25, 2002

(87) PCT Pub. No.: WO01/18100

PCT Pub. Date: Mar. 15, 2001

(30) Foreign Application Priority Data

Sep. 4, 1999 (GB) .............................................. 9920843

(51) Int. Cl.⁷ ................................................ C08K 3/40
(52) U.S. Cl. ....................... 523/444; 523/527; 523/513; 524/436; 524/437; 524/492; 524/494; 524/523; 524/589; 528/403
(58) Field of Search ................................ 524/494, 437, 524/492, 523, 589; 523/444, 513, 527, 903.3, 400; 528/403

(56) References Cited

U.S. PATENT DOCUMENTS 3,539,533 A * 11/1970 Lee et al. .................... 526/211
3,808,170 A    4/1974 Rogers
4,220,582 A *  9/1980 Orlowski et al. ............ 523/116
5,693,413 A * 12/1997 Hesterman et al. ......... 428/325

FOREIGN PATENT DOCUMENTS

| DE | 198 45 050 A | | 4/1999 | |
| JP | 07-090805 | | 4/1995 | |
| JP | 07090805 A | * | 4/1995 | ............. E01C/5/22 |

OTHER PUBLICATIONS

South African Patent Application No. ZA 812389, Cornelius Andries Van Tonder, Apr. 9, 1981.
Jun. 15, 2004 handwritten letter.
Decor Glass (2 pages).
An e-mail with PDF document, entitled "Best Practices in Glass Recycling—Epoxy Applications for Recycled Glass" (total of 3 pages).
An Abstract of the "World" patent corresponding to the application.
A newspaper article entitled "Inventor of Walkman wins Millions from Sony".

* cited by examiner

*Primary Examiner*—Margaret G. Moore
*Assistant Examiner*—Marc S Zimmer
(74) *Attorney, Agent, or Firm*—Venable LLP; Marina V. Schneller

(57) ABSTRACT

The invention describes a solid glass composite comprising glass granules and a binder resin which may be used in a wide range of applications, for example, flooring, furniture, lighting, work surfaces and architectural features.

21 Claims, No Drawings

GLASS COMPOSITE

The present invention relates to a glass composite and, in particular, but not exclusively, a glass composite which utilises waste glass from consumer, automotive and construction sources.

Research is increasingly being directed to the recycling problems of waste glass from various industries and from domestic sources. Recycling of waste glass for many industries necessitates purification of the glass for its subsequent re-use. Nevertheless, due to the costs of purification, much of the waste glass is still committed to undesirable landfill sites. New applications for the use of waste glass would alleviate much of the waste disposal problems associated with waste glass.

According to a first aspect of the present invention, there is provided a solid glass composite matrix comprising glass granules and a binder resin which has set to bind the granules into a solid composite.

Preferably, the glass granules comprise between 40% and 90% w/w of the composite matrix, more preferably, between 65% and 85% w/w of the composite matrix, most preferably, between 75% and 85% w/w of the composite matrix.

When lower levels of glass granules are utilised other bulking sources may be added to the resin to top up the glass level. For instance, sand may be added to the mix as a bulking agent and to increase silica levels. As much as 50% bulking agent may be used, more appropriately as much as 30%, most appropriately, as much as 10%. Other potential bulking agents include mineral fillers such as bauxite and flint. However, the use of sand or other bulking agents is not preferred.

The percentage level of glass granules achievable in the composite is higher than is possible with non-resin binders. Typically, the level of glass granules is higher than 60% w/w of the composite matrix, more preferably, higher than 70% w/w of the composite matrix, most preferably higher than 75% w/w of the composite matrix.

The glass granules may, preferably, comprise up to 75% w/w of the composite matrix, more preferably up to 80% w/w of is the composite matrix, most preferably up to 85% w/w of the composite matrix.

Preferably, the glass granules are derived from waste glass. Preferably, the waste glass has been crushed to produce the granules. Typically, the crushed glass granules have been washed, dried and graded. Typically, the glass granules are obtained from crushed glass which may be derived from glass plate or any other convenient source.

Preferably, the glass granules in the matrix have a grain size substantially between 0.0 mm and 20.0 mm. Preferably, at least 70% of the granules are between 0.0 mm and 10.0 mm, more preferably at least 80%, most preferably, at least 90% of the granules are between 0.0 mm and 10.0 mm.

Preferably at least 50% w/w of the glass composite matrix comprises glass granules of grain size 0 mm–6 mm, more preferably, at least 70% w/w of the glass composite matrix comprises glass granules of grain size 0 mm–6 mm, most preferably, at least 80% w/w of the glass composite matrix comprises glass granules of grain size between 0 mm–6 mm.

Preferably, at least 10% w/w of the glass composite matrix comprises glass granules of grain size 0 mm–4 mm, more preferably, at least 20% w/w of the glass composite matrix comprises granules of grain size 0 mm–4 mm, most preferably, at least 30% w/w of the glass composite matrix comprises granules of grain size 0–4 mm.

Preferably, at least 10% w/w of the glass composite matrix comprises glass granules of grain size, 4 mm–6 mm, more preferably, at least 20% w/w of the glass composite matrix comprises glass granules of grain size 4 mm–6 mm, most preferably, at least 30% w/w of the glass composite matrix comprises glass granules of grain size 4–6 mm.

Glass granules of between 6–10 mm may also be present in the composite matrix. Granules between 6–10 mm may be present at a level less than 50% w/w, more preferably, at a level less than 30% w/w, most preferably, at a level less than 25%.

Nevertheless, in some applications it is envisaged that 4–6 mm granules or 6–10 mm granules are present at up to 90% w/w, more preferably, up to 80% w/w, most preferably, up to 70% w/w of the composite matrix.

The waste glass may be derived from any suitable source including automotive, construction and consumer sources.

The glass may be clear or coloured or mixtures of colours and the colour of the glass grains may be utilised decoratively. In addition, larger decorative glass pieces greater than 10 mm grain size may be added to the composite. In some cases, a decorative outer layer containing such pieces may be added to the base matrix. Such pieces larger than 10 mm have not been taken into account herein in relation to the total weight of composite in stating the preferred % w/w of glass grains in the composite or the preferred % w/w of resin or other components in the composite.

Preferably, the matrix is ground after setting to provide a finish. Polishing may also be carried out. However, advantageously, with compositions of the invention, it is also envisaged that no grinding or secondary processes will be required. For instance, when producing tiles from moulds, it is possible to produce tiles from the moulds with high quality finish.

Preferably, the binder resin comprises between 5% w/w and 20% w/w of the composite matrix, more preferably between 7.5% and 17.5% of the composite matrix, most preferably, between 10% and 15% w/w of the composite matrix.

Preferably, the resin is polymeric and requires a curing agent or initiator to set.

Preferably, a coupling agent is present in the composite, to couple the glass and resin components together during setting of the composite, preferably, by chemical reaction with both components.

The coupling agent may be a silane coupling agent, preferably, an organo-functional silane coupling agent.

Preferably, the coupling agent is selected from a suitable silane, titanate ester or zirco-aluminate.

The resin may be selected from any suitable binder resin including epoxy resins, polyurethane binders, unsaturated polyester binders and poly $C_1$–$C_2$ alkyl methacrylate binders. Preferably, the polyalkyl methacrylate binder is polymethyl methacrylate.

A typical epoxy resin binder consists of the diglycidyl ether of bisphenol F or bisphenol A or mixtures thereof.

Typically, the average number molecular weight is less than or equal to 1000, more preferably 800, most preferably, 700. A reactive diluent may be added to suit viscosity requirements. Typically, the reactive diluents comprise mono-functional or di-functional aliphatic or cycloaliphatic glycidyl ethers or esters. One or more of these may be mixed together in any proportions or used solely. A preferred diluent is a less viscous glycidyl ether such as $C_{12}$–$C_{14}$ alkyl glycidyl ether. The specific diluent may be varied to suit viscosity requirements. Typically, the diluent is present at a level of 5–30% of the pre-cured resin, more preferably 10–25%.

The coupling agent may be present in the pre-cured resin at a level of 0.1–4.0% W/w, more preferably 0.5–3.0%, most preferably 1.0–2.0% w/w.

The curing agent is preferably a UV stable moiety. A suitable UV stable curing agent for epoxy resin is octahydro-4,7-methano-1H-indendinethylamine.

Typical polyurethane binders comprise polyethers and/or polyester polyols together with aliphatic isocyanate curing agents.

Typical unsaturated polyester binders may comprise light stabilised orthophthalic or isophthalic resins together with a suitable initiator such as an organic peroxide. Typically, the alkyl methacrylate binders consist of aliphatic polyalkyl methacrylate copolymers or terpolymers together with a suitable initiator such as an organic peroxide initiator.

Preferably, the binder resin is UV stable. Preferably the ratio of glass granules to binder resin and coupling agent is in the range of 6:1 to 3:1, more preferably 11:2 to 7:2, most preferably 5:1 to 4:1.

According to a second aspect of the present invention, there is provided a method of producing a glass composite comprising the steps of:— contacting an aggregate of glass granules of average grain size less than 10 mm with a binder resin, mixing the granules into the un-set resin, and allowing the resin to set so that the resin sets the granules into a solid composite matrix.

Preferably, the method of the second aspect may incorporate any one or more of the features of the first aspect of the invention.

Advantages of the use of resin together with waste glass granules include the low level of chemical reactivity between the resin and the silica in the glass so that the composite produced is highly stable. Furthermore, it has been found that it is possible to introduce higher levels of glass in a resin substrate than alternative substrates. Due to contamination risks, preferably, the resin is substantially solvent free.

The composite of the invention provides an impervious surface which may be UV stable and has excellent chemical resistance against typical materials such as:

oil, petrol, diesel, anti-freeze, salts, beverages, urine and dilute acids and alkalis.

Advantageously, prior to setting, the composite may be shaped in three dimensions and inconsistencies in the final set shape may be simply corrected by filling or polishing as is necessary. The casting techniques may be any of those known to those skilled in the art including vacuum-, pressure- and vibro-casting.

The composites of the invention may be utilised in many applications including:

internal and external flooring, furniture, lighting, work surfaces, architectural features such as skirting, architraves and sanitary work and the invention extends to methods of making such products using the method of the second aspect of the invention or the product of the first aspect. Furthermore, impervious examples of the product may be utilised as material for commercial food preparation surfaces and chemical, including pharmaceutical, preparation surfaces. It is also envisaged that the invention may be used in applications which require high resistance to radiation such as natural, electro magnetic or nuclear radiation. Such applications include products and fittings in x-ray facilities in hospitals and sites within the nuclear industry. For such applications, it is preferred that the lead and/or barium level in the glass granules is sufficient to appreciably reduce the radiation transmission through the composite. A possible source of such glass granules with a high level of lead and/or barium is waste glass from VDU screens.

Preferably, the glass granules for screening applications has lead or barium or combined lead/barium levels at at least 3% by weight as a percentage of the raw constituent of the glass, more preferably at least 7% by weight, most preferably, at least 10% by weight. Preferably, the lead or barium levels or combined lead/barium levels for such applications are in the range 10–70% by weight in the glass granules, more preferably 20–70% by weight in the glass granules, most preferably, 40–70% by weight in the glass granules.

Further advantages of the composites of the invention are the high flexural strength and impact resistance. It is envisaged that these properties may be utilised in the production of body armour, including stab and ballistic body armour, either as part of a laminate with available materials or for total replacement of existing materials.

Tests have shown that materials according to the invention have excellent slip resistance, impact resistance, low thermal expansion, high compressive strength, high flexural strength, high tensile strength and high abrasion resistance.

Internal and external flooring may be in the form of floor tiles. Preferably, the floor tiles are at least 3 mm, more preferably at least 6 mm. A preferred range is 4–35 mm, a more preferred range 6–25 mm, a most preferred range is 8–20 mm. Such thickness ranges are considerably less than those employed for the equivalent concrete paving which they replace. Advantageously, the toughness and flexibility of the material allows much thinner floor coverings to be used whereas concrete of equivalent thickness would crack due to its higher brittleness threshold.

Examples of the present invention will now be described.

EXAMPLES

The compositions of examples 1–10 are shown respectively in tables 1–5 and 16–20 which show the relative weight percentages and absolute weights of the various constituents of the composites.

The epoxy resin in examples 1–10 comprises a blend of 80–84% bisphenol A & F, 15–19% $C_{12}$–$C_{14}$ alkyl glycidyl ether as a diluent and 1% glycidoxy-functional silane coupling agent.

All these products produced high quality products after grinding and polishing.

The method of preparation of composite is as follows.

i. The glass is weighed out in the correct percentages of each grain size and colour. (Usually 0–4 mm, 4–6 mm and 6–10 mm, in colours green bottle, amber bottle, blue bottle and clear plate). See examples.
ii. The resin binder is mixed to the correct ratios (Base, catalyst and pigment), see examples, until an even dispersion is achieved.
iii. The glass is then mixed thoroughly into the mixed resin binder.
iv. The "mix" is then either trowelled into moulds (for production of tiles or three dimensional items eg. furniture) or laid directly onto a preprepared floor surface as a screed.

Curing times@20° C.

24 hours . . . 70%

7 days . . . 95%

28 days . . . 100%

Although all curing times can be varied by using additives.

v. Ideally, the mix should be "finished" in the period after 24h and before 48h, to the finish required (Currently, ground, polished or wire brushed)

TABLE 1

(Example 1)

| Constituency | Percentage | Weight | Comments |
|---|---|---|---|
| Epoxy resin | 12.61 | 378.34 | Clear |
| Octahydro-4,7-methano-1H-indendimethyl amine. | 6.42 | 192.60 | Clear |
| Pigment RAL No. 4004 BS No. | 0.03 | 0.94 | |
| Aggregate mm 0.4 | 39.97 | 1200 | Clear Plate |
| Aggregate mm 4–6 | 40.97 | 1230 | Clear Plate |
| Aggregate mm 6–10 | 0 | 0 | |
| Total | 100 | 3001.88 | |

TABLE 2

(Example 2)

| Constituency | Percentage | Weight | Comments |
|---|---|---|---|
| Epoxy resin | 11.67 | 262.92 | Clear |
| Octahydro-4,7-methano-1H-indendimethyl amine. | 5.89 | 132.75 | Clear |
| Pigment RAL No. 6019 Bs No. | 0.12 | 2.60 | |
| Aggregate mm 0.4 | 40.87 | 920.50 | Clear Plate |
| Aggregate mm 4–6 | 41.45 | 933.75 | Clear Plate |
| Aggregate mm 6–10 | 0 | 0 | |
| Total | 100 | 2252.52 | |

TABLE 3

(Example 3)

| Constituency | Percentage | Weight | Comments |
|---|---|---|---|
| Epoxy resin | 13.11 | 996.87 | Clear |
| Octahydro-4,7-methano-1H-indendimethyl amine. | 6.35 | 483 | Clear |
| Pigment RAL No. 9003 BS No. | 0.13 | 9.87 | |
| Aggregate mm 0–4 | 35.31 | 2685.00 | Clear Plate |
| Aggregate mm 4–6 | 45.10 | 3430.00 | Clear Plate |
| Aggregate mm 6–10 | 0 | 0 | |
| Total | 100 | 7604.74 | |

TABLE 4(a)

(Example 4a)

| Constituency | Percentage | Weight | Comments |
|---|---|---|---|
| Epoxy resin | 10.95 | 93.68 | Clear |
| Octahydro-4,7-methano-1H-indendimethyl amine. | 5.27 | 45.05 | Clear |
| Pigment RAL No. 9003 | 0.32 | 2.73 | |
| Aggregates | | | |
| 0.4 mm | 58.13 | 497.25 | Blue |
| 4–6 mm | 25.34 | 216.75 | Blue |
| 6–10 mm | 0.00 | 0.00 | |
| Total | 100 | 855.46 | |

TABLE 4(b)

(Example 4b)

| Constituency | Percentage | Weight | Comments |
|---|---|---|---|
| Octahydro-4,7-methano-1H-indendimethyl amine. RAL No. 9003 0.4 mm 4–6 mm 6–10 mm | 1.98 | 30.00 | Green Blue Easy to trowel |

TABLE 5

| Constituency | Percentage | Weight | Comments |
|---|---|---|---|
| Epoxy resin | 14.04 | 120.15 | Clear |
| Octahydro-4,7-methano-1H-indendimethyl | 6.85 | 58.65 | Clear |

TABLE 5-continued

| Constituency | Percentage | Weight | Comments |
|---|---|---|---|
| amine. | | | |
| Pigment | | | |
| RAL No. | | | |
| 9003 | 0.04 | 0.30 | |
| 5005 | 0.01 | 0.10 | |
| BS No. | | | |
| Aggregates | | | |
| 0–4 mm | 19.87 | 170.00 | Clear Plate |
| 4–6 mm | 38.74 | 331.50 | Clear plate |
| | 0.58 | 5.00 | Green |
| 6–10 mm | 19.87 | 170.00 | |
| Total | 100.00 | 855.70 | |

Tables 6–10 reveal grain size distribution for suitable glass granular samples which may be used with resins in accordance with the present invention.

TABLE 6

Breakdown of Glass Samples

| Grain Size (mm) | Mass (g) | Percentage |
|---|---|---|
| 2–3.15 | 293.30 | 29.33 |
| 1–2 | 400.30 | 40.03 |
| 0.71–1 | 97.10 | 9.71 |
| 0.5–0.71 | 62.90 | 6.29 |
| 0.25–0.5 | 76.50 | 7.65 |
| 0–0.25 | 69.90 | 6.99 |

TABLE 7

| Grain Size (mm) | Mass (g) | Percentage |
|---|---|---|
| 3.15–4 | 5.00 | 0.50 |
| 2–3.15 | 244.70 | 24.47 |
| 1–2 | 338.50 | 33.85 |
| 0.71–1 | 102.00 | 10.20 |
| 0.5–0.71 | 79.20 | 7.92 |
| 0.25–0.5 | 109.50 | 10.95 |
| 0–0.25 | 121.10 | 12.11 |

TABLE 8

| Grain Size (mm) | Mass (g) | Percentage |
|---|---|---|
| >4 | 78.60 | 7.86 |
| 3.15–4 | 127.00 | 12.70 |
| 2–3.15 | 239.00 | 23.90 |
| 1–2 | 244.00 | 24.40 |
| 0.71–1 | 114.50 | 11.45 |
| 0.5–0.71 | 75.10 | 7.51 |
| 0.25–0.5 | 91.30 | 9.13 |
| 0–0.25 | 30.50 | 3.05 |

TABLE 9

| Grain size (mm) | Mass (g) | Percentage |
|---|---|---|
| >4 | 134.03 | 13.40 |
| 3.15–4 | 192.06 | 19.21 |
| 2–3.15 | 339.50 | 33.95 |
| 1–2 | 174.20 | 17.42 |
| 0.71–1 | 52.58 | 5.26 |

TABLE 9-continued

| Grain size (mm) | Mass (g) | Percentage |
|---|---|---|
| 0.5–0.71 | 31.28 | 3.13 |
| 0.25–0.5 | 44.60 | 4.46 |
| 0–0.25 | 31.75 | 3.17 |

TABLE 10

| Grain Size (mm) | Mass (g) | Percentage |
|---|---|---|
| >4 | 112.00 | 11.20 |
| 3.15–4 | 172.00 | 17.20 |
| 2–3.15 | 315.55 | 31.56 |
| 1–2 | 200.00 | 20.00 |
| 0.71–1 | 77.00 | 7.70 |
| 0.5–0.71 | 46.00 | 4.60 |
| 0.25–0.5 | 49.50 | 4.95 |
| 0–0.25 | 28.00 | 2.80 |

Test examples 6–10 have compositions as set out in tables 16–20.

The test results on example 6–10 are shown in tables 11–15 respectively.

Table 11 shows the impact resistance of example 6 which has been carried out in four separate tests. The recorded penetration is very low given that a maximum indentation depth of 3 mm is all that is required for a high (category A) soundness level. Table 12 shows that the coefficient of expansion of example 7 is similar to steel which makes the material highly suitable for applications in combination with steel to minimise differential rates of expansion and contraction in variable temperature environments.

TABLE 11

| | Recorded Penetration |
|---|---|
| Test No 1 | 0.5 mm |
| Test No 2 | 0.4 mm |
| Test No 3 | 0.2 mm |
| Test No 4 | 0.0 mm |

TABLE 12

| | Mean Coefficient of |
|---|---|
| Test age 7 days | $3.0 \times 10^{-5}$ |
| Test age 28 days | $4.2 \times 10^{-5}$ |

Table 13 shows that the flexural strength of example 8 is very high and this may give opportunities in combination with flexible backing surfaces or substrates such as soil or earth.

TABLE 13

| | Flexural Strength (N/mm$^2$) |
|---|---|
| Test age 7 days | (See Note 1) |
| Test age 28 days | 41.9 (see Note 2) |

Note 1—Test pieces flexed without failure, flexural strength can not be recorded.
Note 2—Test pieces 1 and 3 had air bubbles on the fracture surface, test 2 flexed a long way before failure.

Table 14 shows a comparison of abrasion resistance with a concrete floor slab for example 9. The sample performs at a much higher level and shows improved abrasion resistance compared with concrete.

TABLE 14

| | Mean Wear Depth | Results from an external concrete floor slab (For comparison) |
|---|---|---|
| Test Duration 2 hours | 0.038 mm | |
| Test Duration 1 hour | 0.025 mm | |
| Test Duration 15 minutes | 0.00 mm | 1.21 mm |

Advanced humidity and resistance to liquids tests for example 1 were carried out. The resistance to humidity test comprised cyclic condensation between −10° C. and 40° C. following BS 3900 Part F2: 1989. The resistance to liquids test was carried out using the water immersion method of BS 3900: Part G8: 1993. The example was found to have satisfactory resistance to water immersion and cyclic condensation at temperatures between −10° C. and 40° C. at 100% humidity.

TABLE 15
(Example 6)
Impact Testing (Sample)

| Constituency | Percentage | Weight | Comments |
|---|---|---|---|
| Epoxy resin | 11.17 | 251.67 | Clear |
| Octahydro-4,7-methano-1H-indendimethyl amine. | 5.65 | 127.35 | Clear |
| Pigment RAL No. 2010 BS No. | 0.06 | 1.25 | |
| Aggregates | | | |
| 0–4 mm | 42.66 | 960.97 | Clear Plate |
| 4–6 mm | 40.46 | 911.25 | Clear Plate |
| 6–10 mm | 0.00 | 0.00 | |
| TOTAL | 100.00 | 2252.49 | |

TABLE 16
(Example 7)
Coefficient of Thermal Expansion Sample

| Constituency | Percentage | Weight | Comments |
|---|---|---|---|
| Epoxy resin | 13.22 | 396.99 | Clear |
| Octahydro-4,7-methano-1H-indendimethyl amine. | 5.80 | 174.00 | Clear |
| Pigment RAL No. 1014 | 0.03 | 0.99 | |
| Aggregates 0–4 mm | 20.49 | 615.00 | Green |
| | | 615.00 | Amber |
| 4–6 mm | 19.99 | 600.00 | Amber |
| | 19.99 | 600.00 | Green |
| Aggregate mm 6–10 | 0 | 0 | |
| TOTAL | 79.51 | 3001.98 | |

TABLE 17
(Example 8)
Flexural Strength Sample

| Constituency | Percentage | Weight | Comments |
|---|---|---|---|
| Epoxy resin | 11.17 | 251.67 | Clear |
| Octahydro-4,7-methano-1H-indendimethyl amine. | 5.65 | 127.35 | Clear |
| Pigment RAL No. 2010 | 0.06 | 1.25 | |
| Aggregates | | | |
| 0–4 mm | 42.66 | 960.97 | Clear Plate |
| 4–6 mm | 40.46 | 911.25 | Clear Plate |
| 6–10 mm | 0.00 | 0.00 | |
| TOTAL | 100.00 | 2252.49 | |

TABLE 18
(Example 9)
Abrasion Testing Sample

| Constituency | Percentage | Weight | Comments |
|---|---|---|---|
| Epoxy resin n | 13.25 | 397.98 | Clear |
| Octahydro-4,7-methano-1H-indendimethyl amine. | 5.79 | 174.00 | Clear |
| Pigment RAL No. 9003 | 0.07 | 1.98 | |
| Aggregates | | | |
| 0–4 mm | 47.94 | 1440.00 | Green |
| 4–6 mm | 32.95 | 990.00 | Green |
| 6–10 mm | 0.00 | 0.00 | |
| TOTAL | 100.00 | 3003.96 | |

TABLE 19
(Example 10)
Coefficient of Friction Sample

| Constituency | Percentage | Weight | Comments |
|---|---|---|---|
| Epoxy resin | 11.17 | 251.67 | Clear |
| Octahydro-4,7-methano-1H-indendimethyl amine. | 5.65 | 127.35 | Clear |
| Pigment RAL 2010 | 0.06 | 1.25 | |
| Aggregates | | | |
| 0–4 mm | 42.66 | 960.97 | Clear Plate |
| 4–6 mm | 40.46 | 911.25 | Clear Plate |
| 6–10 mm | 0 | 0 | |
| TOTAL | 100.00 | 2252.49 | |

The reader's attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extend to any novel one, or any novel combination, of the features disclosed in this specification (including any accompanying claims, abstract and drawings), or to any novel one, or any novel combination, of the steps of any method or process so disclosed.

What is claimed is:

1. A solid glass composite matrix comprising glass granules and a binder resin which has been cured and which binds the glass granules into a solid composite, wherein the solid glass composite matrix comprises more than 60% w/w of glass granules
which have a grain size of 4 mm–6 mm.

2. A solid glass composite matrix,
comprising glass granules and a binder resin which has been cured and which binds the glass granules into a solid composite, wherein the solid glass composite matrix comprises more than 60% w/w of glass granule
which have a grain size of 4 mm–6 mm and
which further comprises bulking sources selected from the group consisting of sand, silica, bauxite and flint.

3. A solid glass composite matrix according to claim 1, wherein the glass granules are derived from waste glass.

4. A solid glass composite matrix, comprising glass granules and a binder resin which has been cured and which binds the glass granules into a solid composite, wherein the solid glass composite matrix comprises more than 60% w/w of glass granules
grain size of 4 mm–6 mm and
which further comprises glass granules in the matrix which have a grain size substantially between 0.0 mm and 20.0 mm.

5. A solid glass composite matrix according to claim 1, wherein at least 50% w/w of the glass composite matrix further comprises glass granules of grain size between 0 mm–6 mm.

6. A solid glass composite matrix according to claim 1, wherein at least 10% w/w of the glass composite matrix comprises glass granules of grain size between 0 mm–4 mm.

7. A solid glass composite matrix according to claim 1, wherein the binder resin comprises between 5% w/w and 20% w/w of the composite matrix.

8. A solid glass composite matrix, comprising glass granules and a binder resin which has been cured and which binds the glass granules into a solid composite, wherein the solid glass composite matrix comprises more than 60% w/w of glass granules
a grain size of 4 mm–6 mm and
wherein a coupling agent is present in the composite, to couple the glass and resin components together during setting of the composite.

9. A solid glass composite matrix, comprising glass granules and a binder resin which has been cured and which binds the glass granules into a solid composite, wherein the solid glass composite matrix comprises more than 60% w/w of glass granules
a grain size of 4 mm–6 mm and
wherein a reactive diluent is added to suit viscosity requirements.

10. A solid glass composite matrix according to claim 9, wherein the diluent is present at a level of 5–30% of the pre-cured resin.

11. A solid glass composite matrix according to claim 8, wherein the coupling agent is present in the pre-cured resin at a level of 0.1–4.0% w/w.

12. A solid glass composite matrix according to claim 8, wherein the ratio of glass granules to binder resin and coupling agent is in the range of 6:1 to 3:1.

13. A solid glass composite matrix according to claim 1, wherein the glass granules for screening applications have lead or barium or combined lead/barium levels of at least 3% by weight.

14. A solid glass composite matrix according to claim 13, wherein the lead or barium levels or combined lead/barium levels for such applications are in the range 10–70% by weight in the glass granules.

15. The solid glass composite matrix of claim 1 wherein the glass granules comprise between 65% and 85% w/w of the composite matrix.

16. The solid glass composite matrix of claim 1 which has a ratio of glass granules to binder resin and a coupling agent which is in the range of 6:1 to 3:1.

17. The solid glass composite matrix of claim 1 wherein the binder resin is a cured resin selected from the group consisting of epoxy resins, polyurethane binders, unsaturated polyesters and poly $C_1$–$C_2$ alkyl methacrylate binders.

18. The solid glass composite matrix of claim 1 which has a binder resin which is an epoxy resin.

19. A method of producing a glass composite comprising the steps of:
contacting an aggregate of glass granules of average grain size between 0 mm and less than 10 mm with a binder resin,
mixing the granules into the un-set resin, and
allowing the resin to set so that the resin sets the granules into a solid composite matrix wherein the solid glass composite matrix comprises more than 60% w/w of glass granules which have a grain size of 4 mm–6 mm.

20. The method of claim 19 where the binder resin is admixed with a coupling agent which is effective to couple the glass and resin components together by chemical reaction.

21. A solid glass composite matrix comprising glass granules and a binder resin which has been cured, and binds the glass granules into a solid composite,
wherein said binder resin further comprises a reactive diluent which is added to control viscosity; and
wherein the reactive diluent is selected from the group consisting of mono-functional 1 aliphatic glycidyl ethers, di-functional 1 aliphatic glycidyl ethers, mono-functional cycloaliphatic ethers, di-functional cycloaliphatic glycidyl ethers, mono-functional 1 aliphatic glycidyl esters, di-functional 1 aliphatic glycidyl esters, mono-functional cycloaliphatic glycidyl esters, and di-functional cycloaliphatic glycidyl esters.

* * * * *